United States Patent [19]
Sankaran et al.

[11] Patent Number: 5,638,893
[45] Date of Patent: Jun. 17, 1997

[54] PARTING AGENT SPRAY SYSTEM

[75] Inventors: Subbiah Sankaran; Apparao Duvvuri, both of Riverside, Calif.

[73] Assignee: FATA Hunter, Inc., Riverside, Calif.

[21] Appl. No.: 133,610

[22] Filed: Oct. 7, 1993

[51] Int. Cl.$^6$ .................................................. B22D 11/07
[52] U.S. Cl. .................... 164/472; 164/5; 164/268; 164/428; 164/480
[58] Field of Search ..................... 164/472, 5, 72, 164/267, 268, 428, 480, 149

[56] References Cited

U.S. PATENT DOCUMENTS

| | | |
|---|---|---|
| 3,191,251 | 6/1965 | Olsson . |
| 3,557,866 | 1/1971 | Barrow et al. . |
| 3,795,269 | 3/1974 | Leconte et al. . |
| 4,437,834 | 3/1984 | Vogel . |
| 4,450,891 | 5/1984 | Belden et al. . |
| 4,501,315 | 2/1985 | Bercovici . |
| 4,605,170 | 8/1986 | Thurner ........................ 164/149 X |
| 4,653,303 | 3/1987 | Richard . |
| 4,691,758 | 9/1987 | Palmer . |
| 4,892,133 | 1/1989 | Solignac . |
| 5,099,667 | 3/1992 | Schmitter et al. . |
| 5,163,562 | 11/1992 | Wilhelm et al. . |
| 5,169,417 | 12/1992 | Straub . |

FOREIGN PATENT DOCUMENTS

| | | | |
|---|---|---|---|
| 4233964 | 4/1993 | Germany ................. 164/472 |
| 57-11753 | 1/1982 | Japan ...................... 164/472 |
| 59-144556 | 8/1984 | Japan ...................... 164/267 |
| 60-221148 | 11/1985 | Japan ...................... 164/5 |
| 63-207451 | 8/1988 | Japan . |
| 63-207452 | 8/1988 | Japan . |
| 1-162544 | 6/1989 | Japan . |
| 2-89551 | 3/1990 | Japan ...................... 164/267 |
| 4-143059 | 5/1992 | Japan ...................... 164/267 |

OTHER PUBLICATIONS

"Continuous Casters for Aluminum Mini–Sheet Mills—An Alcoa Perspective", Bachowski, et al. *Casting of Near Net–Shaped Products*, The Metallurgical Society, 1988.

*Primary Examiner*—J. Reed Batten, Jr.
*Attorney, Agent, or Firm*—Knobbe, Martens, Olson & Bear, LLP

[57] ABSTRACT

The parting agent spray system is used with a roll casting machine to reduce the parting problems associated with releasing the casting-strip from the rolls. The parting system comprises a bank of self-cleaning spray nozzles for each of the upper roll and the lower roll of the caster. Each bank of nozzles is enclosed in its own individual housing which terminates proximal to the surface of the roll, and is movably located on a track. The housing is utilized to contain any excess graphite spray and prevent it from escaping from the area around the roll caster and contaminating the surrounding environment. The nozzles are grouped into zones, each zone connected to a parting agent solution source via an influent parting agent solution line, and connected to an air source via an air supply line for controlling the flow of the parting agent solution through each of the nozzles and atomizing the same, thus allowing the nozzles in each zone to be independently manipulated. Finally, each housing surrounding the nozzles is connected to a cyclone separator for removing the excess parting agent from the housing which has not been applied to said roll of the roll caster so as to eliminate contamination of the external environment with the excess parting agent. The excess parting agent which is extracted from the housing is separated out by the cyclone separator and contained for reuse.

33 Claims, 6 Drawing Sheets

PARTING AGENT SPRAY SYSTEM

FIELD OF THE INVENTION

A parting agent spray system for use with a roll casting machine to reduce the parting problems associated with releasing the cast strip from the rolls.

BACKGROUND OF THE INVENTION

A roll caster typically suffers from two types of sticking during the metal forming process, the first is "severe sticking" and the second is "microsticking."

Severe sticking occurs when the surface of the metal strip does not release from the rolls. In this case, the cast metal shears internally to maintain the bulk extrusion of the metal and the surface of the strip is torn away from the roll surface at the exit of the rolls. Severe sticking is very detrimental to both product quality and the operation of the machine. The metal flow mechanisms in the roll bite are such that, in normal operation, the strip can only "stick" to one roll at a time.

To help prevent the onset of the sticking phenomenon, the caster rolls are normally continuously "painted" or sprayed with a graphite lubricant. This lubricant is typically applied with a single spray nozzle or a "bar nozzle" in which numerous "nozzle" holes are present in a single tube. In small quantities, this lubricant assists in the release of the cast metal from the rolls. However, it is important that a correct amount of graphite be applied to the caster rolls.

If too much graphite is applied to one of the rolls, surface defects may appear on the metal cast strip. The surface defects are caused by a reaction between the metal strip and the surface of the rolls which is coated with an aluminum/aluminum oxide coating. The aluminum/aluminum oxide coating on the rolls absorbs the water from the water-based parting agent solution. The absorption of the water is thermally reversible. Thus, when the roll coating comes into contact with the molten metal at the roll nip the water vapor and hydrogen that was previously absorbed is released in the roll nip. This release of water causes tip material degradation, a loss of caster productivity, and minor surface defects on the metal strip.

If too little graphite is applied to one of the rolls, the caster does not enter the sticking condition immediately, but operates for one or more revolutions, consuming the graphite that has accumulated on the surface of the roll. Eventually, however, there is insufficient graphite for the caster to operate in a stable manner, and the strip begins to stick to the graphite-deficient roll. This initial sticking consists of a series of sticks and releases which is referred to as "microsticking." Microsticking can be seen on the strip surface as transverse bands varying in length in the casting direction from 0.25" to 2". This translates into a stick and release frequency of 4 Hz to 0.5 Hz at a casting speed of 60 IPM or 8 Hz to 1 Hz at 120 IPM. As the casting speed further increases, so does the stick and release frequency.

The stick and release phenomenon of microsticking for most cast metal is not tremendously harmful to product quality. Unfortunately, when the areas of the roll surface that have experienced microsticking rotate back into the roll bite, they have no remaining graphite coating and cause continuous severe sticking to occur.

Applying the critical amount of graphite is dependent on the skill of the operator, who must carefully apply enough graphite to prevent both severe sticking and microsticking. In addition, the operator must carefully watch the entire casting cycle because the graphite tends to plug up the graphite spray nozzles. Once the spray nozzles begin to plug up, an insufficient amount of graphite is applied to the rolls and microsticking once again begins to occur.

It is extremely inefficient to rely on an operator to watch the entire casting process and look for signs of microsticking which occurs when the spray nozzles begin to plug up. Further, in order to supply sufficient graphite to the rolls when graphite spray nozzles begin to clog, the operator will increase the amount of spray that is being supplied to the spray nozzles. However, once the nozzles become severely clogged, any increase in the amount of graphite supplied to the spray nozzles will only result in additional clogging. At that time, the casting machine must be halted and the spray nozzles cleaned. Shutting down the machine to clean the spray nozzles, however, seriously reduces the overall productivity of the roll caster.

In the past, when microsticking or severe sticking occurred and adjustments to the amount of graphite which was supplied to rolls did not help, the operator would slightly slow the casting machine to increase the amount of extrusion. However, slowing the casting machine is counterproductive to the ultimate goal of improving the yield of the casting process.

Additionally, with the increasing speeds that are achievable with the latest roll caster designs, greater amounts of parting agents must be applied to the rolls of the roll caster to prevent sticking conditions from occurring. As the amount of parting agent solution applied to the rolls increases, the amount of "over spray" that remains in the surrounding environment increases. The presence of excess amounts of graphite solution in the surrounding environment may result in the improper operation of certain types of magnetic based equipment. In addition, the presence of excess amounts of graphite solution in the surrounding environment may also be detrimental to the health of the employees.

Therefore, there exists a need in the prior art for an improved parting agent spray system that provides a roll casting machine with increased levels of a parting agent while reducing the problems associated with excess levels of parting agents contaminating the surrounding environment.

SUMMARY OF THE INVENTION

A preferred embodiment of the parting agent spray system of the present invention is in communication with a casting machine and provides a continual supply of a parting agent solution to each of the rolls of the casting machine. Preferably, the parting agent solution is a 0.5–6% colloidal solution of graphite and water.

The parting agent spray system preferably comprises a parting agent distribution system and a collection system. The distribution system comprises a bank of spray nozzles for each of the upper roll and the lower roll of the caster, a parting agent supply source, and an air supply source. Each bank comprises a plurality of nozzles which are grouped into separate zones of nozzles. Each bank of nozzles are enclosed in their own individual housing which terminates proximal to the surface of the rolls of the roll caster. The housing is utilized to prevent any excess graphite spray from escaping from the area around the roll caster and contaminating the surrounding environment.

Each zone of nozzles in the distribution system is independently operable. The number of zones of nozzles which are energized to disperse the parting agent solution at a given time is dependent upon the width of the metal sheet that is being formed. In a preferred embodiment, the orientation of each of the nozzles is fixed, i.e., the individual nozzle heads do not oscillate back and forth to spray the graphite across the roll. In order to provide a more even distribution of the graphite spray, all of the nozzles in a single bank are slidably mounted on a track to ensure that the entire surface area of the roll be covered with graphite spray, because if any area is not covered with graphite it could cause sticking to occur in that area of the roll.

The collection system comprises a series of exhaust vents which are connected to a cyclone separator. The collection system is utilized to remove any excess graphite particles from within the housing which do not settle on the rolls of the roll caster. The exhaust vents connect each of the housings surrounding the nozzles to the cyclone separator to form a closed collection system. The cyclone separator spins the air which is extracted from the housing at very high speeds such that the graphite particles separate out from the air. The separated graphite particles and water are collected in a bin at the bottom of the separator for reuse.

DETAILED DESCRIPTION OF THE INVENTION

Before describing the improved parting agent spray system of the present invention in more detail, it is helpful to have a general understanding of a roll casting system into which such a parting system may be incorporated. However, it will be understood that the principles of the present invention relating to an improved parting agent spray system are not limited to the particular roll caster described herein, but can be applied with equal success to roll casters of varying configurations.

General Description of the Roll Casting System

Figure 1:
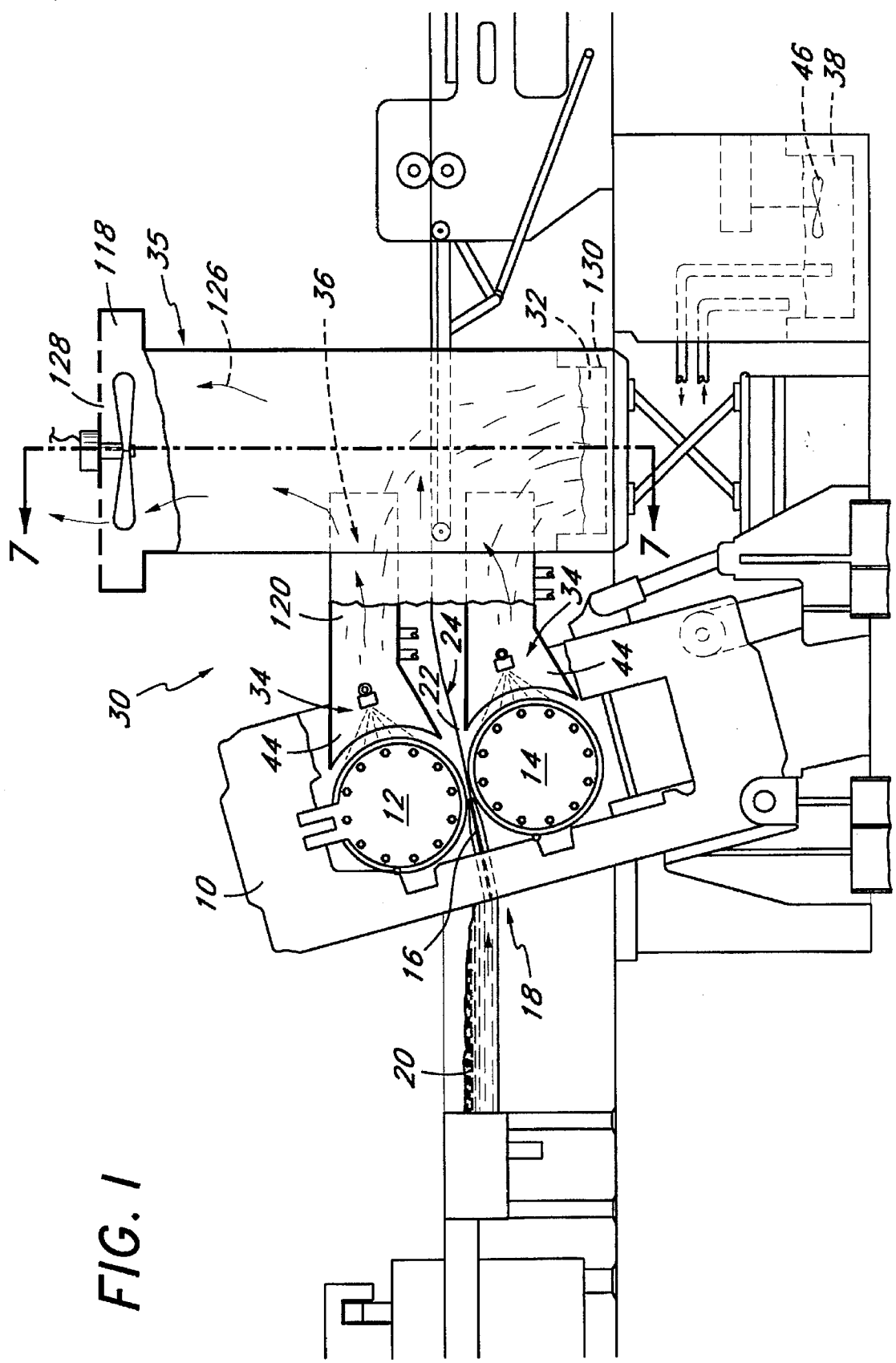
FIG. 1 is a side view of a roll caster employing a preferred embodiment of the improved parting agent system of the present invention.

Referring first to FIG. 1, the principal components of a roll caster into which the present parting system may be incorporated is described as follows.

The roll caster 10 illustrated in FIG. 1 is comprised of two independently driven horizontal rolls, an upper roll 12 and a lower roll 14, which are internally water-cooled and positioned one above the other. These rolls 12, 14 are spaced apart a distance corresponding to the thickness of the strip being cast. A pouring nozzle 16 fits snugly into the converging space between the casting rolls 12, 14 on an entrance side 18 of the roll caster 10. The pouring nozzle 16, usually referred to as the "tip", consists of two parallel thin-lipped slabs of ceramic material. These ceramic components define the long rectangular orifice of the nozzle 16, the long dimension of the nozzle determining the width of the sheet that will exit the roll caster 10.

Molten metal 20 is introduced into the casting machine 10 via the nozzle 16 and is solidified by the rotating water-cooled casting rolls 12, 14; this process is schematically presented in FIG. 1. It should be noted that the exit of the nozzle 16 is slightly ahead of the centerline of the rolls 12, 14. This distance is usually referred to as the "setback." A consequence of this setback is that the molten metal 20 becomes fully solidified at a dimension in excess of the final strip thickness, the rolls 12, 14 then deforming the metal 20 to the final strip thickness. The rolling deformation of the metal 20 results in a strip 22 with precise dimensions, good surface appearance and a high quality, "hot worked," internal structure. The metal strip 22 exits the roll casters on the exit side 24 at its final strip thickness.

Description of the Preferred Embodiments of the Parting Agent Spray System

A preferred embodiment of the parting agent spray system 30 of the present invention, as illustrated in FIG. 1, is in communication with a casting machine 10 to provide a continuous supply of a parting agent 32 to each of the rolls 12, 14 of the casting machine 10. The parting agent spray system prevents both microsticking and severe sticking conditions from occurring during operation of the casting machine. The parting agent spray system 30 comprises a distribution system 34 and a collection system 35. The distribution system 34 disperses a solution 36 of a parting agent 32 mixed with water or any other noncorrosive liquid in atomized form onto the rolls 12, 14 of the roll caster 10. The collection system 35 collects any excess parting agent solution 36 that does not settle on the rolls 12, 14 to prevent contamination of the surrounding environment with the excess parting agent 32.

Figure 2:
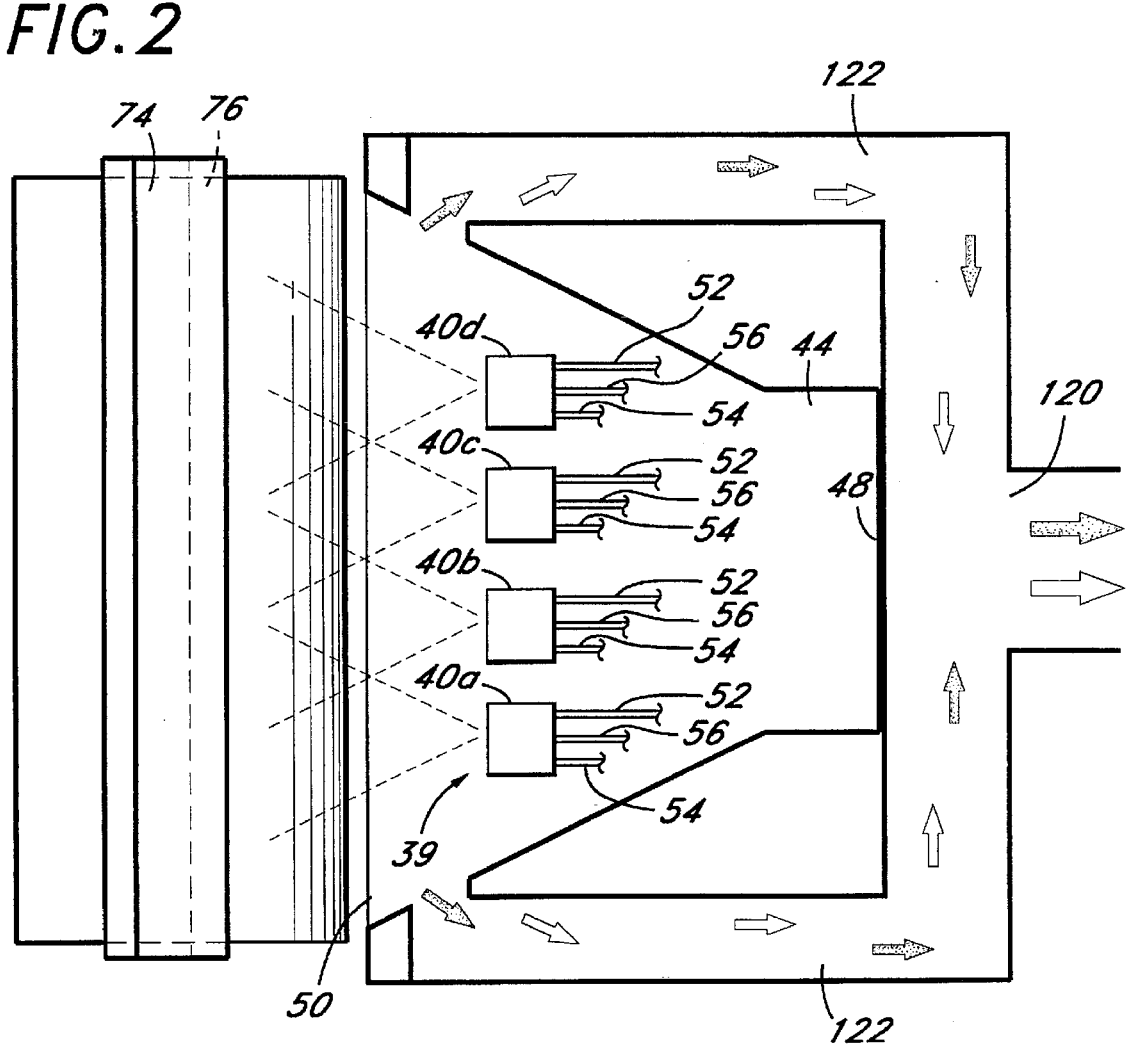
FIG. 2 is a partial top view of a roll caster including a preferred embodiment of the improved parting agent system utilizing a side venting system.
Figure 2A:
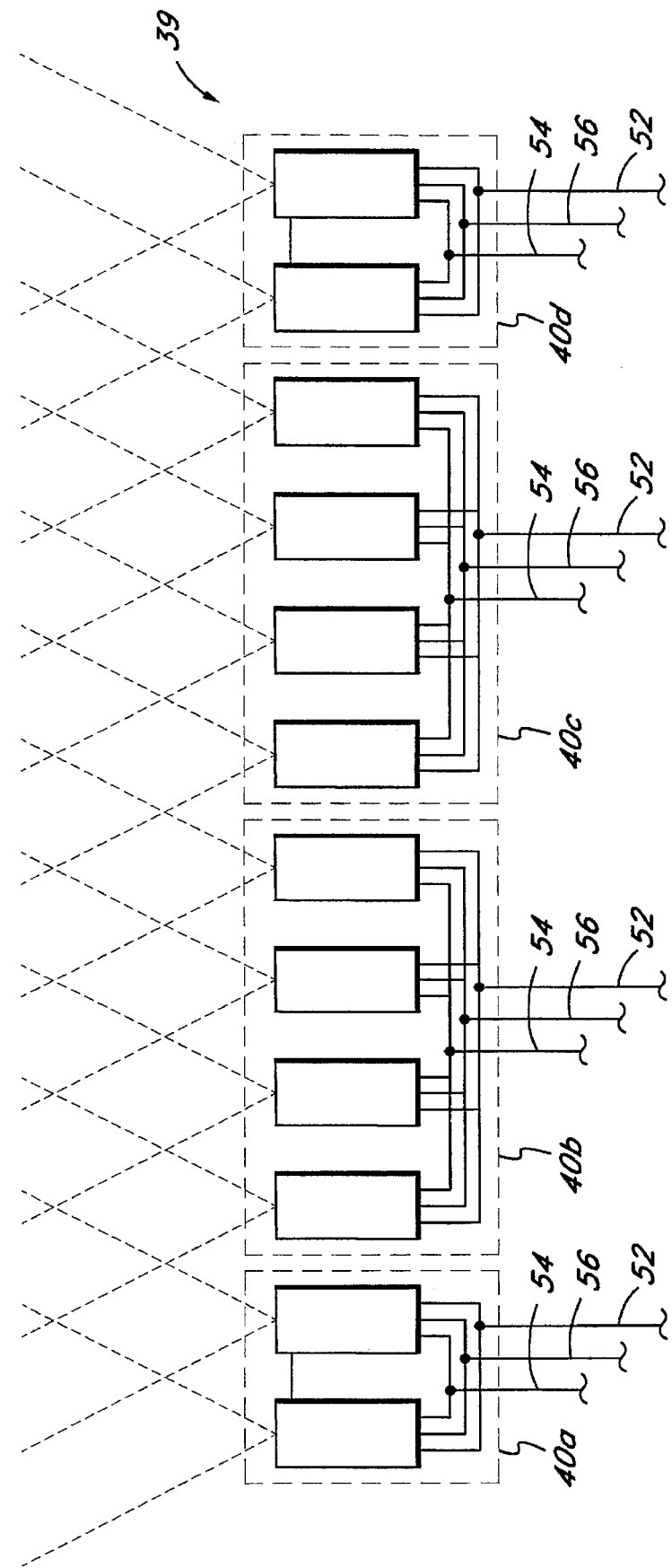
FIG. 2a is an exploded view of a nozzle bank of FIG. 2, illustrating the separation of individual nozzles into zones.

As illustrated in FIGS. 1, 2 and 2a, the distribution system 34 comprises a parting agent solution source 38 and one or more spray nozzles 42 preferably located in a bank 39 for delivering the solution 36 in atomized form to each of the upper roll 12 and the lower roll 14 of the caster 10. Each bank 39 of nozzles 42 is preferably grouped into a plurality of zones 40 of nozzles 42. Each zone 40 of nozzles 42 could be physically separated from the other zones 40 of nozzles 42; however, this is not desirable as any physical barrier between each zone 40 of nozzles 42 could interfere with the distribution of the parting agent solution 26. Therefore, each bank 39 of nozzles 42 are enclosed in their own individual housing 44 which terminates proximal to the surface of the roll 12, 14. Preferably, there is no physical separation within the housing 44 between each of the zones 40 of nozzles 42.

The parting agent solution 36 is preferably a colloidal solution of graphite and water. Preferably, the solution is 0.5–6% graphite by volume of graphite concentrate, when the graphite concentrate contains 35% graphite by weight. Additionally, a small amount of bone ash is added to the parting agent solution 36 to improve the binding of the solution. The colloidal graphite solution must be continuously mixed to keep the graphite suspended in the solution. If the solution is not continuously mixed, the graphite and bone ash separate out from the water and settle to the bottom of the solution. Preferably, a mixer 46, as illustrated in FIG. 1, is used to continuously mix the colloidal graphite solution. In order to maintain the proper suspension, the mixer 46 must operate at a speed of at least 1000 rotations per minute.

Figure 3:
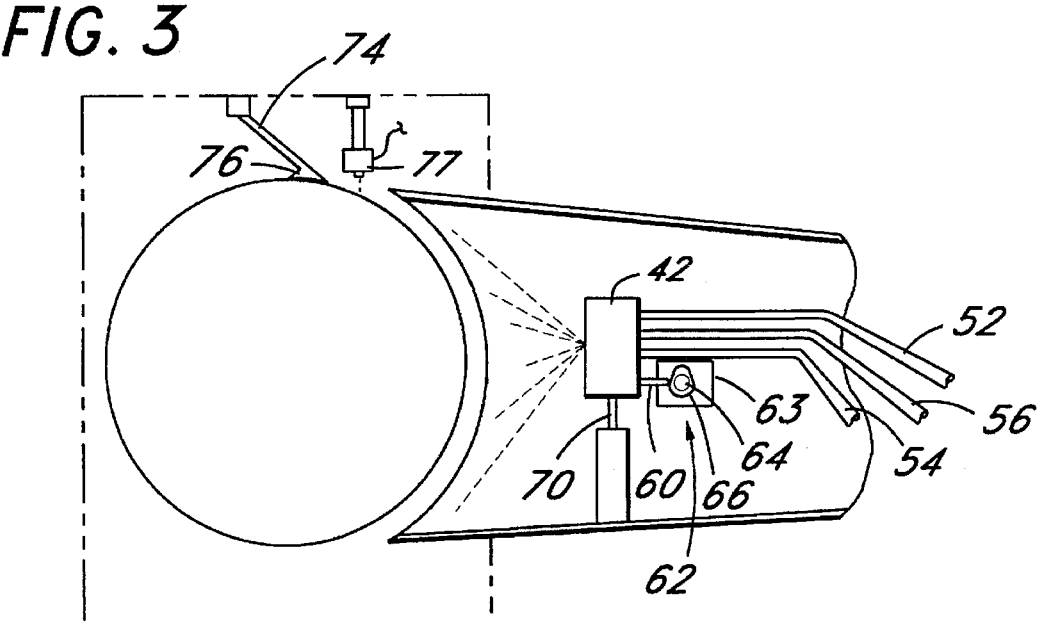
FIG. 3 is a partial cutaway view of the last nozzle of the distribution system.
Figure 5:
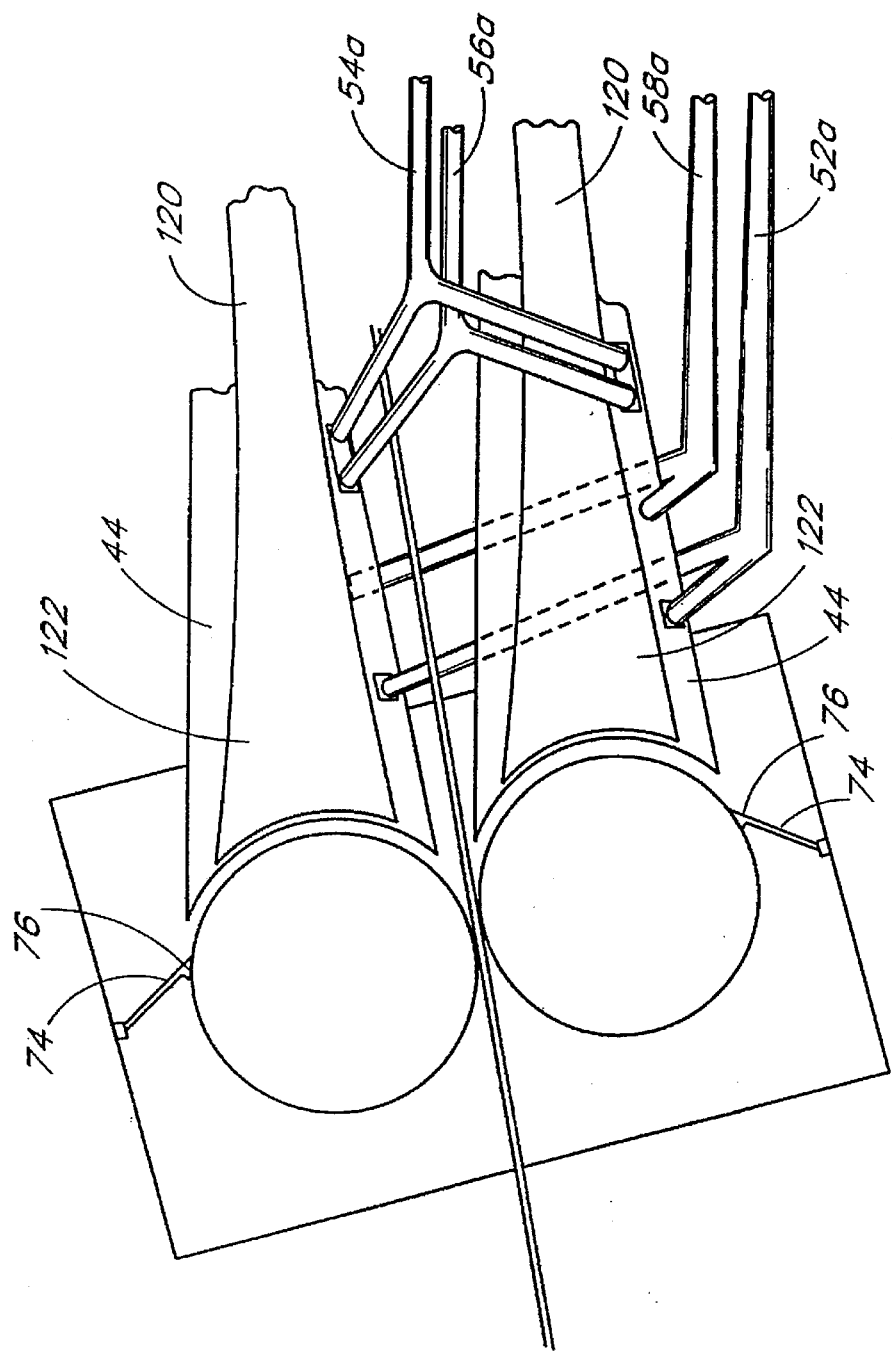
FIG. 5 is a partial side view of the collection system of the preferred embodiment.

FIGS. 2, 2a and 3 more closely illustrate an upper portion of the distribution system 34 including the housing 44 and its relationship with the bank 39 of nozzles 42 positioned adjacent the upper roll 12 of the roll caster 10. It will be understood that a lower portion of the distribution system 34 is identical to the upper portion described and illustrated in FIGS. 2 and 3 except that it is in communication with the lower roll The housing 44 is preferably a six-sided housing, with five closed sides and one open side, which helps to direct the atomized parting agent solution 36 toward the upper roll 12 of the roll caster 10. The housing 44 is narrow at a back enclosed end 48 where the bank 39 of nozzles 42 are mounted, and preferably flares outwardly in both the vertical and horizontal directions as the walls of the housing 44 extend towards the upper roll 12 of the roll caster 10. Flaring the housing 44 walls enables the parting agent 36 to be delivered to a wider surface area of the upper roll 12. An open end 50 of the housing 44 is preferably curved such that its shape conforms to the curved shape of the upper roll 12 of the roll caster 10, as best illustrated in FIGS. 3 and 5. The curved open end 50 of the housing 44 enables the housing 44 to terminate very close to the surface of the upper roll 12 of the roll caster 10, thereby limiting the space between the upper roll 12 and the housing 44 through which parting agent solution 36 which is delivered to, but does not contact the upper roll 12, can escape.

As illustrated in FIGS. 2 and 2a, the nozzles 42 are preferably single-pin actuated nozzles which are mounted along the bank 39 with equidistant spacing between each nozzles 42. Preferably, the nozzles 42 are mounted with a four inch spacing between each nozzle 42. Further, as schematically illustrated in FIGS. 2 and 2a, the nozzles 42 in a bank 39 are preferably grouped into a plurality of zones 40 of nozzles 42. Although four independent zones 40 are illustrated, up to 15 or 20 zones 40 can be utilized depending upon the accuracy of the spray application that is desired. In a preferred embodiment, the zones 40 comprise a first outer zone 40a, a first central zone 40b, a second central zone 40c and a second outer zone 40d. Each zone 40 comprises a plurality of nozzles 42 and the number of nozzles 42 in each zone 40 are not necessary equivalent.

FIG. 2a illustrates an embodiment of the distribution system 34 which comprises first and second outer zones 40a, 40d comprising two nozzles 42 per zone 40. While two nozzles 42 are preferred for the first and second outer zones 40a, 40d, more or less nozzles 42 may be used per zone 40, depending upon the width of the roll and amount of graphite to be applied. Further, the distribution system 34 illustrated in FIG. 2a comprises first and second central zones 40b, 40c comprising four nozzles 42 per zone 40. While four nozzles 42 are preferred for the first and second central zones 40b, 40c, more or less nozzles 42 may be used per zone 40, depending upon the width of the roll and amount of graphite to be applied.

In a preferred embodiment of the distribution system 34, each nozzle 42 is independently operable so that the fluid flow through it is independently adjustable. In a more preferred embodiment as illustrated in FIGS. 2, 2a and 3, each zone 40 of nozzles 42 is independently operable. In the more preferred embodiment, each zone 40 of nozzles 42 is connected to an influent parting agent solution line 87, a regulating atomizing air supply line 56, a cleaning air supply line 54 and an effluent parting agent solution line 58. The parting agent solution 36 is routed to each zone 40 via the parting agent solution influent line 87. During normal operation, a regulated flow of air is routed to each zone 40 of the nozzles 42 to control the amount of fluid which is delivered by each of the nozzles 42 via the regulated atomizing air supply line 56. Further, a control flow of air is applied to each nozzle 42 to enable the operation of the nozzle 42 and to control the cleaning of the nozzles 42 via a cleaning air supply line 54. In a preferred embodiment when a cylinder controlled air nozzle 42 is utilized, the cleaning air supply line 54 is routed to the control cylinder to enable the operation of the nozzles 42. Preferably, within each zone 40, the individual nozzles 42 are connected to the respective influent parting agent solution line 52 of the zone 40, the respective regulating atomizing air supply line 56 of the zone 40, the respective cleaning air supply line 54 of the zone 40, and the respective effluent parting agent solution return line 58 of the zone The amount of parting agent solution 36 that is delivered by each nozzle 42 illustrated in FIGS. 2 and 2a is controlled by the amount of air which is delivered to the nozzle by the regulated atomizing air supply line 56. As the pressure of air delivered to the nozzle 42 by the regulated atomizing air supply line 56 decreases, the amount of parting agent solution 36 that is dispensed decreases. The air which is routed to the nozzle 42 via the regulating atomizing air supply line 56 is mixed internally in the nozzle 42 with the parting agent solution 36 supplied by the parting agent supply line 52, causing the atomization of the parting agent solution 36. It is noted that if the nozzle 42 utilizes external mixing, then as the regulated atomizing air pressure increases, the fluid dispensing rate increases. Any parting agent solution 36 that is delivered to, but not dispensed by the nozzles 42, is returned to the parting agent solution source 38 via a parting agent solution effluent line 58.

The operation of the preferred single-pin air actuated nozzles 42 illustrated in FIGS. 2 and 2a is described below. In order to enable operation of the nozzle 42, air must be constantly supplied to the nozzle 42 by the cleaning air supply line 54 which presses an actuating pin away from the nozzle opening and enables the parting agent solution 36 and atomizing air supplied to the nozzle 42 via the influent parting agent solution supply line 52 and the regulating atomizing air supply line 56 to mix together and exit the nozzle opening. In the preferred embodiment, all of the nozzles 42 are supplied with air from the cleaning air supply line 54 to enable their operation. The actual control of the distribution of the parting agent solution 36 by the nozzles is controlled by the supply of the parting agent solution 36 and the atomizing air to the nozzles 42. When the controlling air provided by the cleaning air supply line 54 is removed from the nozzle 42, the pin is returned to its nozzle opening blocking position by a spring loaded return feature and the atomized parting agent solution 36 is no longer sprayed from the nozzle 42. When the control air is once again supplied to the nozzle via the cleaning air supply line 54, the pin retracts and the spray function of the nozzle 42 is enabled.

Importantly, the nozzles 42 illustrated in FIGS. 2 and 3 include a self-cleaning feature that automatically cleans the spray nozzles by an air-actuated cleaning pin. The self-cleaning feature of the nozzles 42 is employed by quickly cutting off the control air supplied by the cleaning air supply line 54 and then quickly returning the air supplied to the nozzles 42 by the cleaning air supply line 54. When the control air is quickly cut off and then returned on the cleaning air supply line 54, the pin in the nozzle 42 is forced through the nozzle opening by the spring loaded return feature and is quickly returned to the operational position when the air supply is returned to the nozzle 42, thereby forcing out any graphite that has collected in the opening of the nozzle 42. The actual control of the air via the cleaning air supply line 54 will be described in more detail below.

Preferably, the control air supply to the nozzle 42 from the cleaning air supply line 54 is cut off and then returned to the nozzles 42 frequently, such as every 15 seconds or so, to continually clean the nozzles 42. The continual cleaning of the nozzles 42 prevents a buildup of graphite particles from occurring over a long period of time that could render the spray nozzles 42 inoperable, and yet, because the pin movement is so quick, the cleaning does not interfere with the parting spray distribution.

These single pin actuated nozzles 42 described above can be obtained from a number of manufactures. One manufacturer of such nozzles 42 is Spraying Systems Co., located in Bellwood, Ill., who sells the nozzle under the model number 1/4 JAUPMCO nickel plated nozzle assembly. However, as will be recognized by one of skill in the art, any nozzle 42 that includes the above described characteristics can be used. Further, it is recognized that when other types of similar nozzles are used, the appropriate fluid and/or air lines necessary for proper operation may need to be adjusted.

Due to the number of fluid and air lines which must be supplied to each of the zones 40 of nozzles 42, a conduit is preferably utilized to contain the groups of similar lines. As illustrated in FIG. 5, the individual influent parting agent supply lines 52 for each zone 40 are routed to the roll caster 10 within an influent parting agent supply line conduit 52a. The individual effluent parting agent supply lines 58 for each zone 40 are routed from the roll caster 10 to the parting agent solution source 38 within an effluent parting agent supply line conduit 58a. In addition, the individual regulated atomizing air supply lines 56 for each zone 40 are routed to the roll caster 10 within a regulated atomizing air supply line conduit 56a. Lastly, the individual cleaning air supply lines 54 for each zone 40 are routed to the roll caster 10 within a cleaning air supply line conduit 54a.

Further, it is noted that while the nozzles are preferably cleaned using the air control system described, it is possible to have the nozzle opening cleaning feature be manually controlled. In the manual embodiment as illustrated in FIG. 3, the nozzle cleaning feature comprises a manually actuated lever 60 and a cleaning pin (not illustrated) that is pushed through the nozzle 42 by the actuating lever 60 to unclog the spray nozzle 42. In order to ensure that the manual actuation of the cleaning pin is periodically triggered, a rotating cam system 62 can preferably be utilized and installed adjacent the actuating lever 60 of the cleaning pin. The rotating cam system 62 comprises an elongated cam shaft 64 with a series of cams 66 mounted on the shaft 64. Each cam 66 is positioned on the shaft 64 to align with the manual actuating lever 60 of each nozzle 42. The cam shaft 64 is rotated such that the manual actuating lever 60 of each nozzle 42 is triggered by its respective cam 66, pressing the cleaning pin through the nozzle opening to clean out the excess graphite.

The number of zones 40 of nozzles 42 in the bank 39, as illustrated in FIG. 2, that are energized at a given time is dependent upon the width of the metal sheet 22 that is being formed on the rolls 12, 14, as it is not necessary to coat an area of the roll 12, 14 which does not come into contact with the metal sheet 22 that is being formed. For example, if a relatively narrow metal sheet 22 is being formed, then only the first and second central zones 40b, 40c of nozzles 42 may be used. If a larger sheet is to be formed, then the first outer zone 40a, the first central zone 40b, the second central zone 40c and the second outer zone 40d of nozzles 42 may be used to spray the parting agent solution 36 onto the casting rolls 12, 14. It should be understood that the exact zones which are used depends on the number of zones 40 designed for use with the roll, and the exact width of strip cast.

In one embodiment (not illustrated), all the nozzles 42 are fixed in a single orientation, i.e., the individual nozzles 42 do not move in any direction to spray the parting agent solution 36 across the roll 12, 14. Since the nozzles 42 do not move independently to spray the parting agent solution 36 across the length of the roll 12, 14, the parting agent solution 36 is delivered to an area of the roll 12, 14, which while spraying is directly in line with the spray nozzle 42.

In a preferred embodiment, as illustrated in FIGS. 2 and 3, in order to provide a more even distribution of the parting agent solution 36, all the nozzles 42 in a single bank 39 are mounted on a track 70. The track 70 is fixed to each individual housing 44 to provide a secure base upon which the bank 39 of nozzles 42 can move. The track is mounted in parallel alignment to a longitudinal axis of the rolls 12, 14. Oscillatory movement of the bank 39 of nozzles 42 back and forth along the track 70 (and, hence, parallel to the longitudinal axis of the roll) is preferably accomplished by a hydro-check air cylinder which actuates an arm or piston connected to said bank 39 of nozzles, although any motorized mechanical arm or other mechanical mechanism known to one of skill in the art may be used. Further, it is possible to have each zone 42 of nozzles 40 move on independent tracks.

As illustrated in FIG. 3, the track 70 upon which the nozzles 42 are mounted allows the bank 39 of nozzles 42 to move a preferred distance of 2 inches, although the nozzles 42 may move a larger or smaller distance depending on the varied coverage desired. Since the track 70 allows the bank 39 of nozzles 42 to oscillate several inches, it is ensured that the entire surface area of the roll 12, 14 is covered by the parting agent solution 36. It is important that the entire surface area of the roll be covered with the parting agent solution 36 to prevent microsticking from occurring in those areas of the roll which are not sufficiently coated with the graphite spray.

In an additional alternate embodiment (not illustrated), the first and second central zones 40b, 40c of nozzles 42 in the bank 39 are oscillatable, i.e., the first and second central zones 40b, 40c of nozzles 42 oscillate back and forth along the track 70, such that the central zones 40b, 40c of nozzles 42 can cover an area which is larger than just the area directly in front of the central zones 40b, 40c with the atomized parting agent solution 36. In the alternate embodiment, the oscillating central zones 40b, 40c of nozzles 42 are used most frequently, as the size of the metal strip 22 being formed is usually of a medium size; therefore, the two central zones 40b, 40c of nozzles 42 are almost always used. In the instances where the metal sheet 22 is wider than the standard medium sized sheet, one or both of the outer zones 40a, 40d of nozzles 42 are also energized. The first and second outer zones 40a, 40d of nozzles 42, which represent the outermost boundary of the desired spraying area, are fixed to prevent the nozzles 42 from spraying the parting agent solution 36 outside of the desired boundary of the roll caster 10.

In normal operation of the roll caster 10, the parting agent solution 36 is continually supplied to the rolls 12, 14 of the roll caster 10. During the system start-up, often small pieces of molten metal break off from the initially formed metal sheet 22 and stick to the rolls 12, 14 of the roll caster 10, regardless of the amount of parting agent solution 36 applied. These initial pieces of metal that stick to the roll 12, 14 are preferably scraped off the rolls 12, 14 utilizing a brass scraper 74, illustrated in FIG. 3, which drags along the surface of the roll 12, 14 just above the location where the housing 44 terminates. After the roll caster 10 warms up, these small pieces of metal cease to be created. At that point, the brass scraper 74 is preferably covered with a soft buffing cloth 76. The soft cloth 76 prevents the scraper 74 from scraping off the parting agent solution 36 with which the rolls 12, 14 were just coated. Further, the soft buffing cloth 16 aids in the even distribution of the applied parting agent solution 36 across the surface of the rolls 12, 14.

Preferably, an optical sensor 77, as illustrated in FIG. 3, is mounted on the roll caster adjacent each of the upper 12 and lower rolls 14 to measure the amount of graphite which is applied to the rolls 12,14. The optical sensor 77 provides a necessary feedback signal to a control system 78 (described in more detail below) which is utilized along with other parameters to determine when the optimal level of graphite has been applied to the rolls 12, 14. This sensor 77 may measure the amount of light reflected off of the rolls 12, 14 as changed by the amount of dark graphite applied to the rolls by the nozzles 42.

Figure 4:
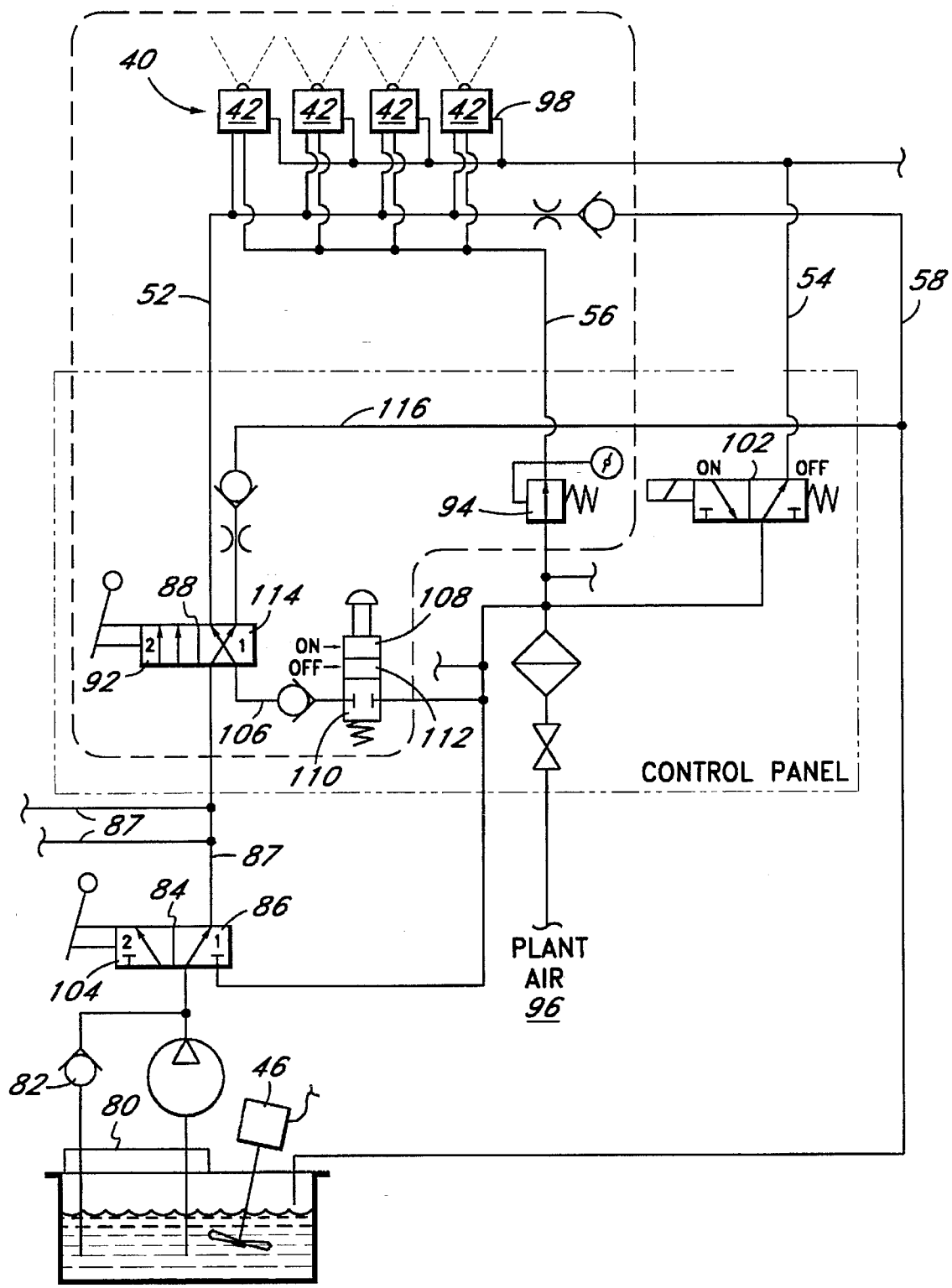
FIG. 4 is a process flow diagram illustrating the control system for the parting agent spray system of the present invention.

FIG. 4 illustrates a process control drawings for a control system 78 for controlling the operation of the parting agent distribution system 34. The portion of the drawing which is enclosed within the dotted lines is repeated for each individual zone 40 of nozzles 42 to enable individual control of each zone 40. The portion of the control drawing which is outside of the dotted lines is provided only once and is utilized to control the entire distribution system 34 in the same manner. The control system 78 is operable in two modes: a normal parting agent distribution mode and an air-purge cleaning mode. In the air purge cleaning mode, a blast of air is run through the entire system to clean out any graphite that has collected in the supply lines. In the normal parting agent distribution mode, the parting agent solution 36 is delivered to the rolls 12, 14. Additionally, the nozzles 42 are cleaned intermittently in a step that is part of the normal parting agent distribution mode.

Beginning at the bottom of FIG. 4, the parting agent solution source 38, which as described above, contains a colloidal solution of graphite and water, is maintained in suspension utilizing the mixer 46. The mixer 46 preferably operates at 1200 revolutions per minute and continuously mixes the solution 36 of graphite and water to maintain the proper suspension.

When in the parting agent distribution mode, the colloidal solution of graphite and water is drawn out of the parting agent solution source 38 by a pump 80. Preferably, the pump 80 operates to pull the parting agent solution 36 from the solution source 38 at a pressure between 3 and 11 psi. If the pressure exceeds 11 psi, a crack pressure valve 82 vents the parting agent solution 36 back into the solution source 38.

During the parting agent distribution mode, the parting agent or graphite solution 36 is led to a first two-way selector valve 84. A first position 86 of the valve 84 enables the normal operation of the parting agent system, i.e., the delivery of the graphite solution 36 to the nozzles 42, and routed the parting agent solution to a system parting agent solution supply line 87. As illustrated in FIG. 4, the parting agent solution supply line 87 is routed to a second two-way selector valve 88 for each of the zones 40. The second two-way selector valve 88 routes either the graphite solution 36 for normal operation of the system or air 90 for the air-purge cleaning of the system to its respective zone 40 of nozzles 42. During normal operation, the second two-way valve 88 is set to a second position 92 to enable the delivery of the graphite solution 36 to its respective zone 40 of nozzles 42 by an influent parting agent solution supply line 52.

When the system is in normal operation, fluid flows to each of the nozzles 42 in the zone 40, as illustrated in FIG. 4, via the respective influent parting agent solution supply line 52 going to each zone 40 of nozzles 42. As stated above, the amount of parting agent solution 36 that is dispersed by each nozzle 42 is controlled by the amount of air that is delivered to each of the nozzles 42 in the respective zone 40 via the regulated atomizing air supply line 56.

The pressure of air delivered to each of the nozzles 42 in the respective zone 40 by the flow control air supply line 56 is controlled by an air regulator valve 94, which is connected to the plant air supply 96. The air regulator valve 94 is preferably electronically operated to control the pressure of air 90 that is delivered to the nozzles 42 via the flow control air supply line 56. The electronic control of the air regulator valve 94 is controlled by a number of feedback signals, such as the signal from the optical sensor 77 and the speed of the roll caster 10. In an alternate embodiment, the air regulator valve 94 is controlled manually to enable the operator to make the desired adjustments in the amount of the parting agent solution which is supplied. The more air 90 that is delivered to the nozzle 42 by the flow control air supply line 56, as controlled by the air regulator valve 94, the more parting agent solution 36 that is delivered to the rolls 12, 14.

Depending upon the amount of the parting agent solution 36 that is required by the nozzles 42, a certain percentage of the parting agent solution 36 that is supplied to the zone 40 of nozzles 42, illustrated in FIG. 4, will remain unused. This unused parting agent solution 36 is returned from the zone 40 via an effluent parting agent return line 58 and is delivered to the parting agent solution source 38 This continual pumping and returning of the fluid though the system additionally provides a certain amount of mixing which assists in the maintenance of the graphite and water solution 36 in the desired suspended state.

During the normal distribution cycle, the nozzles 42, illustrated in FIG. 4, are periodically cleaned by the actuation of a pin in the nozzles 42. As described above, if a manual cleaning pin is used, a camming system 62 may be used to periodically actuate the cleaning pin. However, in the preferred embodiment, an automatic cleaning pin is provided. In order to actuate the automatic cleaning feature, the continual supply of air which is supplied to each of the nozzles via the air supply cleaning line 54 is abruptly cut off and then returned. This is accomplished, as illustrated in FIG. 4, by connecting the main plant air supply 96 to nozzle 42 via a cleaning air supply line 54, which is controlled by a solenoid valve 102. When the solenoid valve 102 is not energized, air is continually delivered to the nozzle 42 via the cleaning air supply line 54, keeping the pin of the nozzle in an extended state. When the solenoid valve 102 is energized, the air is prevented from delivery to the spray nozzle 42 via the cleaning air supply line 54, and the cleaning pin retracts to block the nozzle opening. The solenoid valve 102 is quickly deenergized to once again enable delivery of air to the nozzles 42 which retracts the pin and enables the operation of the spray nozzles 42. The short absence of air actuates the cleaning pin in the nozzle 42 to remove any excess graphite which may have accumulated in the nozzle 42.

In a preferred embodiment, the actuation of the solenoid valve 102 is automatically controlled by a timer (not shown) to periodically enable the cleaning of the nozzles 42. Preferably, the solenoid 102 is actuated at a time interval dependent upon the flow rate of solution and the concentration of the graphite solution.

When the control system 78 is in the nozzle air purge cleaning mode, the parting agent solution 36 is prevented from being delivered to the nozzles 42, and is therefore not applied to the rolls 12, 14 of the roll caster 10. Therefore, the system air purge cleaning is only performed when the casting machine 10 is not operating. During the air purge cleaning cycle, when the system is shut off, the first two-way selector valve 84 is set to a second position 104. The second position 104 of the first two-way selector valve 84 disables the delivery of the graphite solution 36 to the main parting agent solution supply line 87. Further, the second position 104 enables the delivery of the plant air 96 to the main parting agent solution supply line 87 to clean out any excess graphite in the system.

During the air purge cleaning mode, the plant air 96 is also delivered to an air purge cleaning line 106 by the operation of an air connection valve 108, illustrated in FIG. 4. During normal operation, the air connection valve 108 is in the OFF position 110 to prevent the plant air 96 from being routed to the second two-way selector valve 88. During the air-purge cleaning mode, the air connection valve 108 is set to the ON position 112, which enables the connection of the plant air 96 to the air purge cleaning line 106.

Once valve 108 has been set to the ON position, the second two-way selector valve 88 illustrated in FIG. 4 is set to a first position 114, which prevents the graphite solution 36 from being delivered to the respective zone 40 of nozzles 42. When the two-way selector valve 88 is set to the first position 114, any excess graphite solution 36 in the lower portion of the influent parting agent solution supply line 52 is routed back to the parting agent supply source 38 via a parting agent return line 116. At the same time, the air in the air purge cleaning line 106 is routed to the upper portion of the influent parting agent solution supply line 52. The air travels though the influent 52 and effluent 58 parting agent solution supply lines, cleaning out all the graphite which has settled in the lines. The graphite and the cleaning air are exhausted into the parting agent solution supply source 38 so the graphite can be reused.

Figure 7:
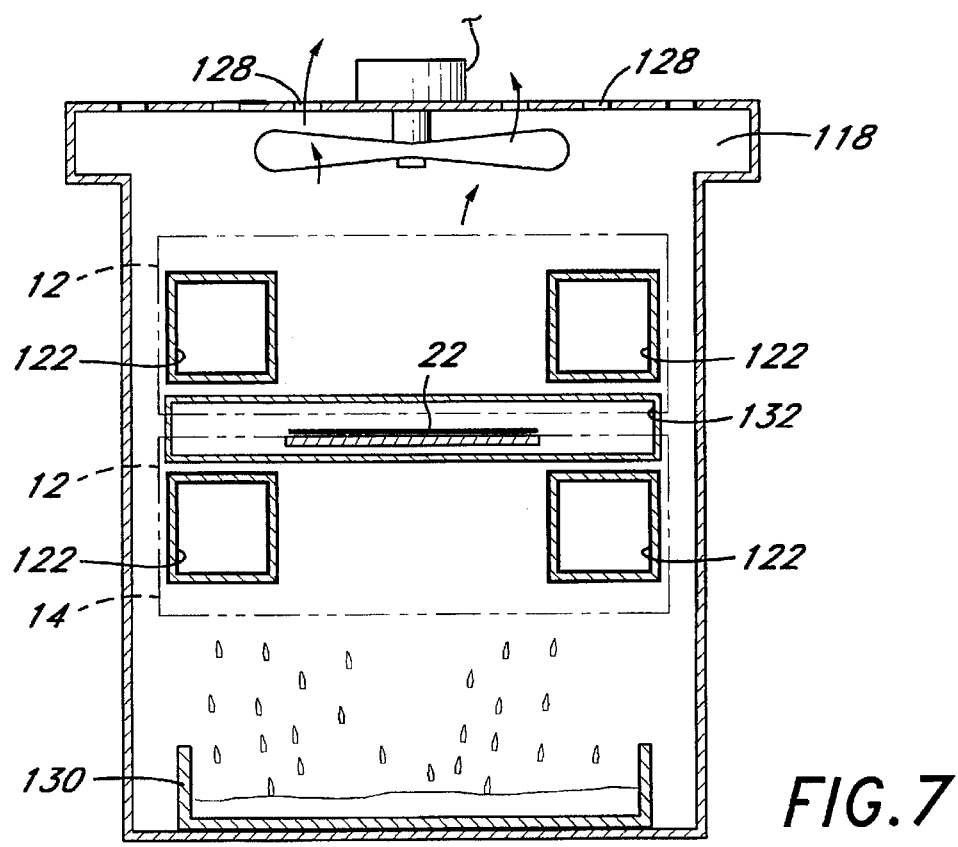
FIG. 7 is a cross sectional view of a preferred embodiment of the collection system taken through the line 7—7 as illustrated in FIG. 1.

The collection system 35 illustrated in FIGS. 1 and 7 is utilized to collect any excess atomized graphite solution 38 that did not adhere to the rolls 12, 14 of the roll caster 10 and separates the graphite particles for reuse. This is accomplished by connecting each of the housings 44 around the spray nozzles 42 to a cyclone separator 118 via a main exhaust vent 120 in order to create a closed system.

FIGS. 2 and 5 illustrate a preferred embodiment of the collection system 35, which utilizes two side exhaust vents 122. The side exhaust vents 122 collect any excess atomized parting agent solution 36, which would normally escape out of the side of the housing 44 and contaminate the surrounding environment. As illustrated more clearly in FIG. 7, each of the two side exhaust vents 122 are connected together behind the housing 44 and are routed to a main exhaust vent 120 which delivers the graphite and air mixture to the cyclone separator 118. It is preferred that the excess graphite be drawn into the exhaust vent, 120, 122 with positive air flow. This air flow can be created by a fan, or more preferably through the operation of a cyclone separator 118 (described in detail below).

As illustrated in FIGS. 2 and 5, the side exhaust vents 122 are advantageous because they generally extract the graphite that would normally escape from the sides of the housing 44, thereby maintaining the desired closed system effect. More desirably, the side exhaust vents 122 do not affect the delivery of most of the graphite solution 36 to the rolls 12, 14 because the side exhaust vents 122 extract the air and graphite at a location in the housing 44 when the parting agent solution 36 has already had a chance to settle on the roll 12, 14 in most cases.

Figure 6:
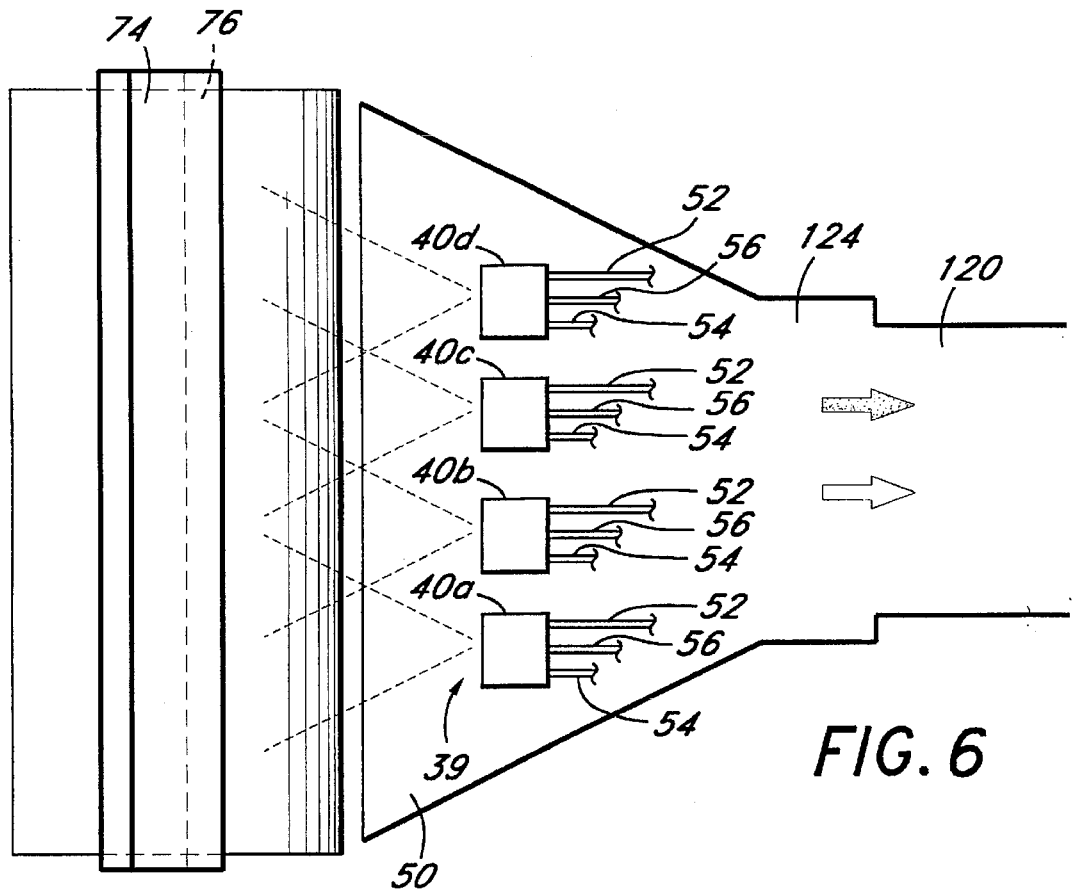
FIG. 6 is a partial top view of a roll caster including an alternate embodiment of the improved parting agent system with a rear venting system.

FIG. 6 illustrates an alternate embodiment of the collection system 35 in which a rear exhaust vent 124 is utilized to collect the excess atomized parting agent solution 36 that has not settled on the rolls 12, 14. The rear vent exhaust 24 is positioned just behind the bank 39 of nozzles 42 and is aligned with the main exhaust vent 120. The air flow generated from the cyclone separator 118 draws out any excess atomized graphite solution 36, which collects in the housing 44 during operation of the nozzles 42. The graphite and air mixture that is extracted from the rear exhaust vent 124 is delivered to the cyclone separator 118 via the main exhaust vent 120.

One potential disadvantage of the rear exhaust vent 124 illustrated in FIG. 6 is that some of the parting agent solution 136 that would normally settle on the rolls 12, 14 may be inadvertently vented by the rear exhaust vent 124 before it has the opportunity to reach the rolls 12, 14. Therefore, in some instances it may be preferable to utilize a venting scheme that collects the excess air and graphite mixture at a location on the housing 44 that is closer in proximity to the rolls 12, 14.

Preferably, a cyclone separator 36, as illustrated in FIGS. 1 and 5, spins the air and graphite mixture extracted from the housing 44 and delivered to the separator through the main exhaust vent 120 at very high speeds to separate the graphite particles or other parting agent particles 32 from the air 126. The weight of the graphite particles 32 that are separated from the air 126 causes the parting agent particles 32 to collect on the sides of the separator 36, where they fall to the bottom of the side exhaust vents 122. These graphite particles 32 are collected in a bin 130 which spans the bottom of the side exhaust vents 122 and can be reused, either by removing the parting agent 32 later, or by returning the parting agent 32 back to the supply source 38. On the other hand, the circulating air 126 is forced out a vent 128 at the top of the cyclone separator 118. Therefore, the collection system 35 provides a closed system which prevents contamination of the external environment. Additionally, the collection system 35 provides a means for reusing the excess graphite particles 32, which would otherwise be wasted.

Importantly, the collection system 35 is designed so as not to interfere with the exiting metal strip 22. Therefore in the preferred embodiment, as illustrated in FIG. 7, a slot 132 or opening is formed in the center of the main and side exhaust vents 120, 122 which is sealed off from the collection system 35. The slot 132 enables the metal strip 22 to continue on its normal pathway to a storage roll (not illustrated) without interfering with the operation of the collection system 35. There are numerous other designs of the collection system 35 which utilize different venting configurations in combination with the cyclone separator 118 which are necessitated by various other casting system designs. These different designs of the collection system 35 are configured to enable the venting of the excess parting agent solution 36 utilizing a closed collection system 35 without interfering with the exiting casting strip 22 or other portions of the roll caster 10.

The present invention may be embodied in other specific forms without departing from its spirit or essential characteristics. The described embodiments are to be considered in all respects only as illustrative and not restrictive. The scope of the invention is, therefore, indicated by the appended claims rather than the foregoing description. All changes which come within the meaning and range of equivalency of the claims are to be embraced within their scope.

What is claimed is:

1. In combination with a twin roll apparatus for continuously casting metal strip, a system for applying a parting agent to at least one roll of said apparatus, comprising:
    a parting agent source for supplying a continuous supply of parting agent;
    a plurality of nozzles arranged in a bank of nozzles along the axis of said roll, each of said nozzles being connected to said parting agent source for dispersing said parting agent onto said roll, the flow through various ones of said nozzles being independently controllable with respect to other ones of said nozzles, whereby the amount of parting agent dispersed along the axis of said roll may be adjusted for efficient and even distribution thereon; and
    mechanism for oscillating at least some of said nozzles along said roll by moving said nozzles in a longitudinal direction along the length of said roll including a track in parallel with the axis of said roll on which at least some of said nozzles are mounted for movement by said oscillation mechanism, wherein said nozzles oscillate while dispersing said parting agent on said roll to distribute said parting agent across the surface of said roll and achieve a more even distribution of said parting agent axially along said roll.

2. The combination of claim 1, wherein said nozzles are grouped into one or more zones, the parting agent flow through each zone of nozzles being independently controllable to vary the amount of parting agent applied along the axis of said roll.

3. The combination of claim 2, wherein there are at least four zones.

4. The combination of claim 2, wherein each of said zones contains two or more nozzles.

5. The combination of claim 1, further including an air supply connected to each of said nozzles for actuating a cleaning pin.

6. The combination of claim 1, further including an air supply connected to each of said nozzles for atomizing said parting agent.

7. The combination of claim 1, further includes means for automatically cleaning said nozzles at predetermined intervals.

8. The combination of claim 1, further comprising a parting agent containment system including housing for containing said nozzles and said dispersed parting agent, said housing including an open front face which is shaped to conform to an outer surface of said roll and at least one side vent disposed adjacent said roll and to the side of said nozzles to extract fugitive airborne parting agent from within said housing which does not adhere to said roll.

9. The parting agent containment combination of claim 7, wherein said housing comprises one enclosed back end, four enclosed sides, and an open end, wherein said open end faces said roll.

10. The parting agent containment combination of claim 9, wherein at least two of said sides flare outwardly towards said open end, whereby said nozzles may apply parting agent over a wide area of said roll.

11. The parting agent containment combination of claim 8, further comprising:
    a cyclone separator; and
    an exhaust vent for connecting said housing to said cyclone separator, wherein excess parting agent in said housing that has not been applied to the roll is drawn into the cyclone separator where it is separated into air which is vented out of the system and residual parting agent which is collected for reuse by the system.

12. The combination claim 8, including a pair of said side vents on both sides of said nozzles.

13. The combination of claim 1, wherein said apparatus for continuously casting metal strip comprises a twin roll caster.

14. The combination of claim 1, further comprising:
    a plurality of an influent parting agent solution supply line;
    said parting agent solution source connected to said nozzles by said influent parting agent solution supply line;
    an air source; and
    a plurality of flow control air supply lines each having a first end connected to said air source by a flow control valve, and a second end connected to said nozzles for controlling the flow of said parting agent solution and said atomizing spray through said one or more nozzles.

15. The combination of claim 14, further including an effluent parting agent solution supply line, said effluent parting agent solution supply line connecting said nozzles to said parting agent solution source for returning the parting agent solution which has not been dispersed by said nozzles to the parting agent solution source for reuse.

16. The combination of claim 14, wherein said nozzles are single-pin air-actuated nozzles and said flow control air supply lines are connected to said nozzles in said zones for actuating a cleaning pin in each of said nozzles for cleaning out any fluid flow obstructions from said nozzles.

17. The combination of claim 14, wherein said nozzles are grouped into at least two zones along the axis of said roll, wherein
    said plurality of influent parting agent solution supply lines each has a first end and a second end, the first end being connected to the parting agent solution source and the second end being connected to one of said zones of nozzles; and
    the second end of each flow control air supply line is connected to one of said zones of nozzles for controlling the flow of said parting agent solution and said atomizing spray through said one zone of nozzles with respect to other zones.

18. The combination of claim 14, wherein there are at least four zones containing at least two nozzles each.

19. The combination of claim 16, further including means for automatically actuating said pin in each of said nozzles for cleaning said nozzles at predetermined intervals.

20. The combination of claim 18, wherein said parting agent solution comprises a colloidal solution of about 0.05% to 6% volume of concentrate in water, when said concentrate comprising of 35% graphite by weight.

21. The combination of claim 20, including means for mixing said graphite and water to maintain a colloidal solution.

22. The combination of claim 1, further including a scraper adapted to remove small bits of metal sticking to the roll.

23. The combination of claim 22, wherein a buffing cloth is mounted to said scraper to enhance even distribution of the parting agent on the roll.

24. In combination with a twin roll apparatus for continuously casting metal strip, a system for applying a parting agent to at least one roll of said apparatus, comprising:

a parting agent source;

a plurality of nozzles arranged in a bank of nozzles along the axis of said roll, each of said nozzles being connected to said parting agent source for dispersing said parting agent onto said roll;

means for oscillating at least some of said nozzles along said roll while dispersing said parting agent on said roll by moving said nozzles in a longitudinal direction along the length of said roll to distribute said parting agent across the surface of said roll, said means for oscillating including a track in parallel with the axis of said roll on which at least some of said nozzles are mounted for movement;

means for independently controlling the mount of parting agent through various ones of said nozzles with respect to other ones of said nozzles, whereby the mount of parting agent dispersed along the axis of said roll may be adjusted for efficient and even distribution thereon;

means for containing excess parting agent which is not applied to said roll; and means for removing said excess parting agent from said containment means.

25. The system of claim 22, further including a plurality of parting agent supply lines and a plurality of atomizing air supply lines connected to said nozzles, such that each of said nozzles applies parting agent in the form of an atomized solution.

26. The system of claim 24, wherein said apparatus for continuously casting metal strip comprises a twin roll caster.

27. A method of applying a parting agent to at least one roll of a twin roll casting machine comprising the steps of:

providing one or more nozzles;

providing a parting agent source;

controlling the dispersement of parting agent through various ones of said nozzles relative to other ones of said nozzles;

dispersing said parting agent through one or more of said nozzles onto said at least one roll of said roll casting machine in a continuous process; and oscillating at least one of said nozzles while dispersing said parting agent on said roll by moving said nozzle in a longitudinal direction along, the length of said roll to distribute said parting agent across the Surface of said roll so as to achieve a more even distribution of said parting agent axially along said roll.

28. The method of claim 27, further including the steps of providing an air source and controlling the flow of said parting agent with air from said air source.

29. The method of claim 27, further including the step of periodically cleaning said nozzles between successive steps of dispersing.

30. The method of claim 27, wherein said step of moving said nozzles comprises displacing said nozzles along a track mounted in parallel with the longitudinal axis of said roll.

31. A system for containing and applying a parting agent for use on a roll of an apparatus for continuously casting metal strip, comprising:

a parting agent source;

plurality of nozzles ganged in a bank of nozzles along the axis of said roll, each of said nozzles being connected to said parting agent source for dispersing said parting agent onto said roll, the flow through various ones of said nozzles being independently controllable with respect to other ones of said nozzles, whereby the amount of parting agent dispersed along the axis of said roll may be adjusted for efficient and even distribution thereon;

a mechanism for oscillating at least some of said nozzles along said roll by moving said nozzles in a longitudinal direction along the length of said roll including a track in parallel with the axis of said roll on which at least some of said nozzles are mounted for movement by said oscillation mechanism, wherein said nozzles oscillate while dispersing said parting agent on said roll to distribute said parting agent across the surface of said roll and achieve a more even distribution of said parting agent axially along said roll;

an influent parting agent line connecting said source to said nozzles;

an effluent parting agent supply line connecting said nozzles to said parting agent source for returning the parting agent which has not been dispersed by said nozzles to the parting agent source for reuse;

a housing for containing the excess parting agent which is not delivered to said roll;

a ventilation system arranged proximate said roll for capturing airborne parting agent which has not adhered to said roll; and a cyclone separator for receiving the excess parting agent and air from said housing via said ventilation system and separating said parting agent from the air.

32. The system of claim 31, further including:

an air source;

an atomizing air supply line connecting said air source and said nozzles for providing air to atomize the parting agent solution for dispersion by said nozzles.

33. The system of claim 31, wherein said apparatus for continuously casting metal strip comprises a twin roll caster.

* * * * *

UNITED STATES PATENT AND TRADEMARK OFFICE
CERTIFICATE OF CORRECTION

PATENT NO. : 5,638,893
DATED : June 17, 1997
INVENTOR(S) : Subbiah Sankaran; Apparao Duvvuri It is certified that error appears in the above-identified patent and that said Letters Patent is hereby corrected as shown below:

```
Column 13, line 22, change "mechanism" to --a mechanism--;

Column 13, line 58, change "The parting agent containment combination
     of Claim" to --The combination of Claim--;

Column 13, line 62, change "The parting agent containment combination
     of Claim" to --The combination of Claim--;

Column 13, line 66, change "The parting agent containment combination
     of Claim" to --The combination of Claim--;

Column 15, line 27, change "The system of" to --The combination of--;

Column 15, line 32, change "The system of" to --The combination of--;

Column 15, line 48, change "the Surface of" to --the surface of--

Column 16, line 11, change "plurality of" to --a plurality of--;

Column 16, line 11, change "ganged in" to --arranged in--
```

Signed and Sealed this

Twenty-fourth Day of March, 1998

*Attest:*

BRUCE LEHMAN

*Attesting Officer*     *Commissioner of Patents and Trademarks*